United States Patent
Toth et al.

(10) Patent No.: US 8,371,156 B2
(45) Date of Patent: Feb. 12, 2013

(54) COMPRESSION SENSOR GASKET ASSEMBLY AND METHOD OF CONSTRUCTION

(75) Inventors: David Toth, Brighton, MI (US); Bhawani Tripathy, Ann Arbor, MI (US); Marcin Fracz, Waterford, MI (US); Daniele DeFranceshi, Windsor (CA)

(73) Assignee: Federal-Mogul Corporation, Southfield, MI (US)

( * ) Notice: Subject to any disclaimer, the term of this patent is extended or adjusted under 35 U.S.C. 154(b) by 380 days.

(21) Appl. No.: 12/791,114

(22) Filed: Jun. 1, 2010

(65) Prior Publication Data

US 2010/0300185 A1 Dec. 2, 2010

Related U.S. Application Data

(60) Provisional application No. 61/182,821, filed on Jun. 1, 2009.

(51) Int. Cl.
*G01M 15/08* (2006.01)
(52) U.S. Cl. .................................................. 73/114.18
(58) Field of Classification Search .............. 73/114.16, 73/114.17, 114.18, 114.19, 114.21
See application file for complete search history.

(56) References Cited

U.S. PATENT DOCUMENTS

| | | | |
|---|---|---|---|
| 5,195,365 A * | 3/1993 | Chujo et al. ............... | 73/114.21 |
| 5,659,132 A | 8/1997 | Novak et al. | |
| 6,532,737 B1 * | 3/2003 | Kozerski et al. ............ | 60/323 |
| 6,533,283 B1 * | 3/2003 | Gottel ........................ | 277/317 |
| 6,701,775 B1 | 3/2004 | Popielas et al. | |
| 6,945,117 B2 | 9/2005 | Boyd et al. | |
| 7,004,472 B2 | 2/2006 | Diez et al. | |
| 7,096,725 B2 * | 8/2006 | Vialard .................... | 73/114.18 |
| 7,111,505 B2 * | 9/2006 | Kestly et al. ............. | 73/114.18 |
| 7,310,993 B2 * | 12/2007 | Popielas et al. ........... | 73/35.12 |
| 7,322,247 B2 * | 1/2008 | Boyd et al. ................ | 73/729.1 |
| 2003/0041589 A1 * | 3/2003 | Kozerski et al. .......... | 60/276 |
| 2005/0006854 A1 * | 1/2005 | Diez et al. ................. | 277/591 |
| 2005/0126262 A1 * | 6/2005 | Popielas et al. ........... | 73/35.12 |
| 2006/0005628 A1 * | 1/2006 | Boyd et al. ................ | 73/729.1 |
| 2006/0096362 A1 * | 5/2006 | Vialard ...................... | 73/119 R |
| 2010/0083740 A1 * | 4/2010 | Lesnau et al. ............ | 73/114.18 |

FOREIGN PATENT DOCUMENTS

WO WO 03071119 A2 8/2003

* cited by examiner

*Primary Examiner* — Eric S McCall
(74) *Attorney, Agent, or Firm* — Robert L. Stearns; Dickinson Wright, PLLC

(57) ABSTRACT

A compression sensor gasket assembly and method of construction thereof is provided. The compression sensor gasket assembly includes a gasket body having opposite sealing surfaces extending between an outer periphery and an inner periphery with the inner periphery bounding a through opening. The gasket body has a passage extending from the outer periphery through the inner periphery and a pressure sensor assembly releasably attached to the gasket body in the passage and being configured to sense pressure within the through opening. The pressure sensor assembly can be removed from the gasket body in service without having to disassemble clamped members from clamped abutment with the gasket assembly. Further, the pressure sensor assembly can be routed over a curved path extending between the outer and inner peripheries to navigate about features that may be present in the gasket body.

15 Claims, 6 Drawing Sheets

FIG. 1
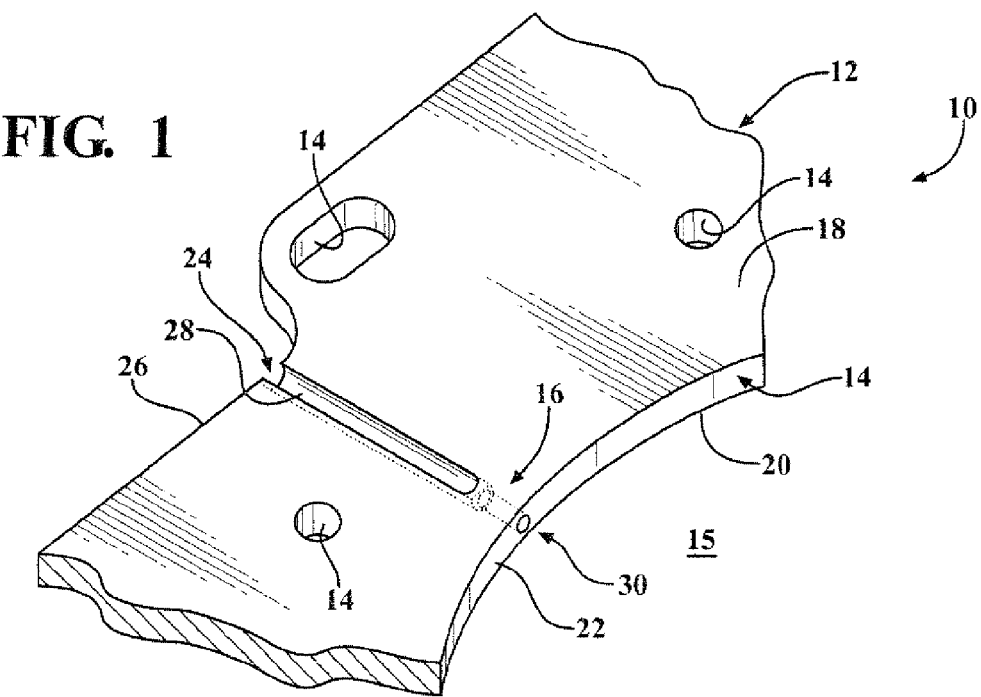
FIG. 2
FIG. 3
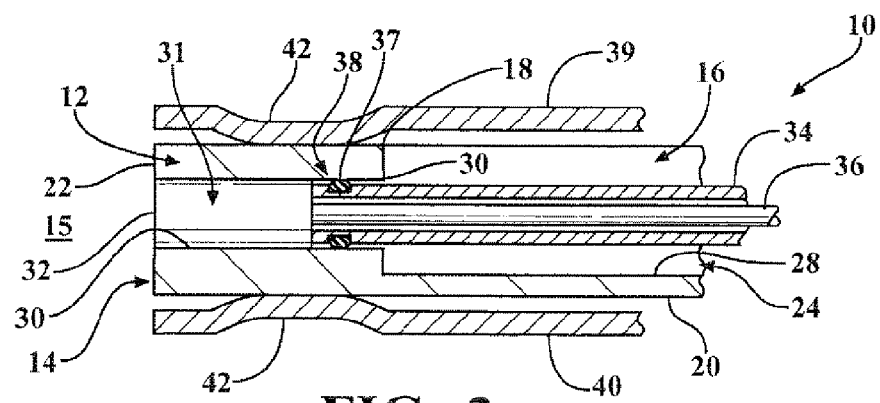

COMPRESSION SENSOR GASKET ASSEMBLY AND METHOD OF CONSTRUCTION

CROSS-REFERENCE TO RELATED APPLICATION

This application claims the benefit of U.S. Provisional Application Ser. No. 61/182,821, filed Jun. 1, 2009, which is incorporated herein by reference in its entirety.

BACKGROUND OF THE INVENTION

1. Technical Field

This invention relates generally to internal combustion engines, and more particularly to compression gaskets for forming a seal about a chamber within an internal combustion engine.

2. Related Art

Internal combustion engines have chambers in which high pressures are generated. Typically, it is desirable to maintain a predetermined pressure within the chambers, such as in oil passages, coolant passages, and/or cylinder bores, for example, without permitting gas and/or fluid to leak from the chambers. Generally, a pair of members mate with one another to form the chamber or chambers, such as a cylinder head and engine block, for example, with a gasket being received between the members to provide a gas/fluid tight seal. In addition to the gasket, it is known to provide a separate pressure sensor to indicate the pressure within the chamber. If the pressure falls outside a predetermined limit, a signal can be sent to indicate a service condition. The indicated pressure signal can be used to optimize the performance of the engine and to minimize the emission from combustion. Having separate gasket and sensor components typically comes at an increased cost, both in manufacture and assembly.

Some attempts have been made to provide a single component gasket and compression sensor assembly. However, these attempts have not been successful due to an increased cost associated therewith, particularly during service. The known gasket/sensor assemblies must be replaced in their entirety during service, thereby leading to the increased cost of having to replace both the gasket and the sensor. Further, the known gasket/sensor assemblies have pressure sensor assemblies that must extend over a straight path, and thus, the pressure sensor assemblies can be difficult to incorporate when various openings in the gasket body provide obstacles to routing the pressure sensor assembly. Accordingly, what is needed is a gasket and sensor assembly that can provide a reliable seal between mating members, provide an accurate indication of the pressure within the cavity being sealed, provide and ability to route the sensor about passages extending between the cylinder head and the engine block, whether straight or curved, allow for servicing of the pressure sensor assembly without having to disassemble the clamped components from the gasket assembly, and be provided in an economical fashion, both in manufacture and in use.

SUMMARY OF THE INVENTION

A compression sensor gasket includes a gasket body having a through passage and a pressure sensor assembly. The pressure sensor assembly is releasably attached in sealed engagement to the gasket body. The pressure sensor assembly is configured to sense pressure within the through passage and is removable from the gasket body in service.

In accordance with another aspect of the invention, a compression sensor gasket assembly is provided. The compression sensor gasket assembly includes a gasket body having opposite sealing surfaces extending between an outer periphery and an inner periphery with the inner periphery bounding a through opening. The gasket body has a passage extending from the outer periphery through the inner periphery and a pressure sensor assembly releasably attached to the gasket body in the passage and being configured to sense pressure within the through opening. Further, the passage includes a circumferentially enclosed bore portion extending between the opposite sealing surfaces. The bore portion is configured for receipt of at least a portion of the pressure sensor assembly. Further yet, the passage includes at least one of a recessed channel portion extending into one of the opposite sealing surfaces and a through slot portion extending through both of the sealing surfaces for receiving another portion of the pressure sensor assembly.

In accordance with another aspect of the invention, a method of constructing a pressure sensor gasket for sensing pressure within a cavity of an internal combustion engine is provided. The method includes providing a substantially flat gasket body having opposite sealing surfaces extending between an outer periphery and a through opening configured to register with a cavity in the internal combustion engine. Further, forming a passage extending from the outer periphery of the gasket body to the through opening, and disposing a pressure sensor assembly in the passage with a sensor portion of the pressure sensor assembly facing the through opening. Further yet, fastening the sensor assembly to the gasket body adjacent the outer periphery.

In accordance with another aspect of the invention, another method of constructing a pressure sensor gasket for sensing pressure within a cavity of an internal combustion engine is provided. The method includes providing a substantially flat gasket body having opposite sealing surfaces extending between an outer periphery and a through opening configured to register with a cavity in the internal combustion engine. Further, forming a passage having a curved portion extending between the outer periphery and the through opening. Then, disposing a pressure sensor assembly in the passage with a portion of the pressure sensor assembly winding through the curved portion.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a partial perspective view of a gasket assembly constructed in accordance with one embodiment of the invention;

FIG. 2 is a cross-sectional plan view of the gasket assembly of FIG. 1;

FIG. 3 is a cross-sectional side view of the gasket assembly of FIG. 1;

DETAILED DESCRIPTION OF PRESENTLY PREFERRED EMBODIMENTS

Figure 4:
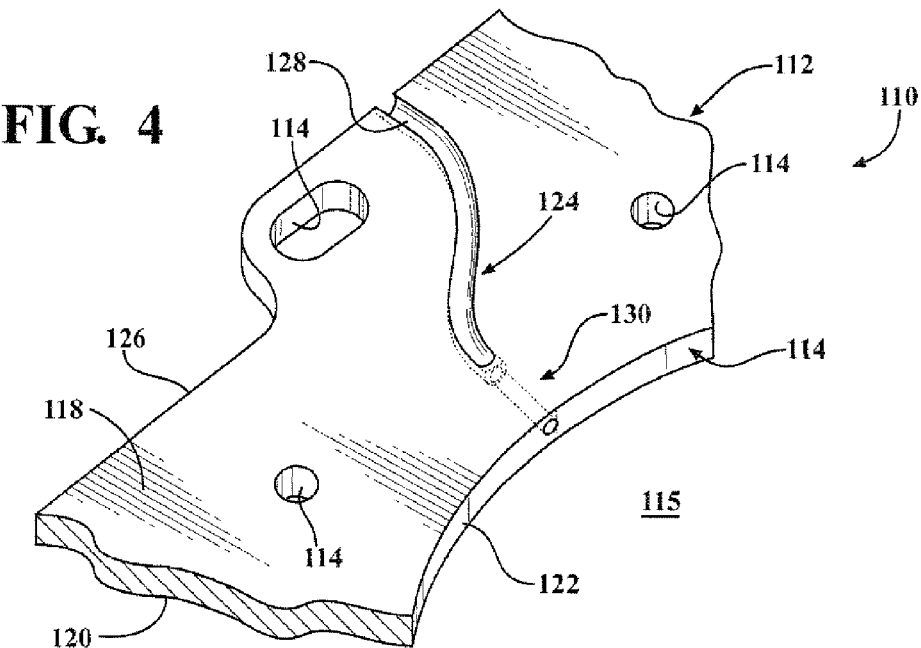
FIG. 4 is a partial perspective view of a gasket assembly constructed in accordance with another embodiment of the invention.

Referring in more detail to the drawings, FIG. 1 illustrates a portion of compression gasket assembly 10 constructed in accordance with one aspect of the invention. The gasket assembly 10 has a metal distance layer, referred to hereafter as a gasket body 12, with one or more through openings 14 for the passage of fasteners, fluid and/or gas therethrough, with at least one of the through openings 14 being configured for alignment with a cylinder bore 15 of an internal combustion engine. The number of openings 14 can be provided as desired to align with multiple cylinders in the internal combustion engine, and further, to align with other openings, such as fastener openings, fluid passages and oil or coolant passages, for example. The gasket assembly 10 includes a pressure sensor assembly 16 releasably attached in sealed engagement with the gasket body 12. The pressure sensor assembly 16 is configured to sense pressure within the through opening 14 or within the passage bounded by the through opening 14, such as the cylinder bore 15. To facilitate servicing the gasket assembly 10, the sensor assembly 16 can be removed from the gasket body 12 and replaced, as necessary, without having to replace or remove the gasket body 12 from its "as assembled" location between mating engine components. Accordingly, the pressure sensor assembly 16 or the gasket body 12 can be serviced independent from one another, thereby allowing the separate gasket assembly components to be repaired or replaced as needed, while being able to continue using the other gasket assembly component.

The gasket body 12 can be provided as a substantially flat body, having opposite sides providing sealing surfaces 18, 20. At least one of the through openings 14 has an inner surface or periphery 22 configured to align and register with the passage being sealed, represented here as the cylinder bore 15. To facilitate attaching the pressure sensor assembly 16 to the gasket body 12, the gasket body 12 has a passage 24 extending from an outer periphery 26 to the inner periphery 22 into the through opening 14. The passage 24 can be formed in part having a circumferentially discontinuous, recessed channel extending into one of the sealing surfaces 18, 20 (not extending through the full thickness of the body 12, thus being closed by one of the sealing surfaces 18, 20) and in part as a through slot (extending completely through the thickness of the body 12, and thus, being open to both sealing surfaces 18, 20) and in part as a tubular, circumferentially enclosed passage extending between, but not through, the opposite sealing surfaces 18, 20, in any combination thereof. For example, as best shown in FIGS. 1, 2 and 3, the passage 24 can be formed as a straight or substantially straight passage having a recessed channel portion, referred to hereafter as channel 28, extending from the outer periphery 26 radially inwardly toward the through opening 14. The recessed channel 28 can be machined, e.g. milled, or otherwise formed in either of the sealing surfaces 18, 20. In addition, the passage 24 can be formed having a circumferentially enclosed tubular portion, represented as a drilled portion 30, shown as extending from the recessed channel 28 radially inwardly through the inner periphery 22. The drilled portion 30 can be sized for a close fit, such as line-to-line or slightly loose fit, with a portion of the pressure sensor assembly 16, or it can be enlarged for receipt of an adaptor sleeve or fitting, discussed further below.

The pressure sensor assembly 16 can be provided having an outer housing 31 configured for receipt in the drilled portion 30 of the gasket body 12, with a pressure sensor 32 configured for receipt in the housing 31. The housing 31 has an outer surface configured for close receipt in the drilled portion 30, and can be configured having a line-to-line fit or a slightly loose fit therein.

In addition, the pressure sensor assembly 16 can be provided having a tubular guide member 34 extending from or substantially from the housing 31 to the outer periphery 26 of the gasket body 12. The guide member 34 has an inner cavity configured to receive a communication member, such as an optical or electrical communication member 36, such as a wire or fiber optic member, therethrough for operable connection to the pressure sensor 32. The communication member 36, in addition to being connected to the pressure sensor 32, is also configured in optical or electrical communication with a processor (not shown) to indicate the pressure within the cylinder bore 15. The guide member 34 can be constructed from any suitable tubular material and can be substantially rigid or flexible, as desired. Accordingly, metallic or polymeric tubular materials can be used to form the guide member 34, such as extruded metal or polymeric tubing, for example.

To facilitate forming a hermetic seal between the pressure sensor 32 and the chamber, e.g. combustion chamber, being sealed, an annular elastomeric seal member 38 can be incorporated between the pressure sensor assembly 16 and the drilled portion 30. The seal member 38 is shown here as an o-ring received about a portion of the guide member 34 extending into the drilled portion 30, with the o-ring having an outer diameter sized for a tight, compressed sealing fit within the drilled portion 30 and having an inner diameter sized for a tight, tensioned sealing fit about the guide member 34. To facilitate locating and maintaining the seal member 38 in the desired position, the seal member 38 can be disposed in an annular groove 37 formed in outer surface of the guide member 34. Of course, other configurations of the seal member 38 are contemplated herein to facilitate forming a gastight seal within the drilled portion 30. In addition, a combustion ring constructed of suitable metallic material can be disposed between the seal member 38 and the cylinder bore 15 to inhibit the hot combustion gasses from reaching the seal member 38, as discussed further below.

The gasket assembly 10, as shown in FIG. 3, can include at least one, and shown here, by way of example and without limitation, as a pair of functional layers 39, 40. The functional layers 39, 40 are arranged for sealing engagement with the oppositely facing sealing surfaces 18, 20, respectively. Each functional layer 39, 40 is represented here, by way of example and without limitation, as having a sealing bead, represented as full sealing beads 42, for example, extending circumferentially about the through opening 14 and the cylinder bore 15 with peaks of the sealing beads 42 shown facing inwardly toward one another for sealing abutment with the opposite outwardly facing sealing surfaces 18, 20.

Figure 5:
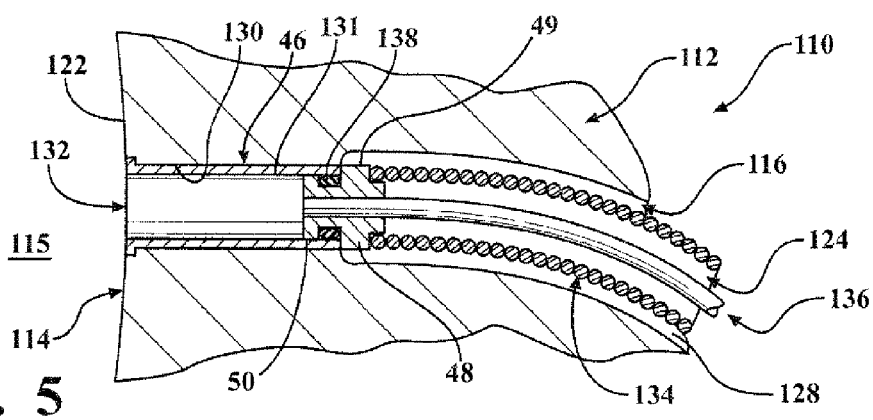
FIG. 5 is a cross-sectional plan view of the gasket assembly of FIG. 4.
Figure 6:
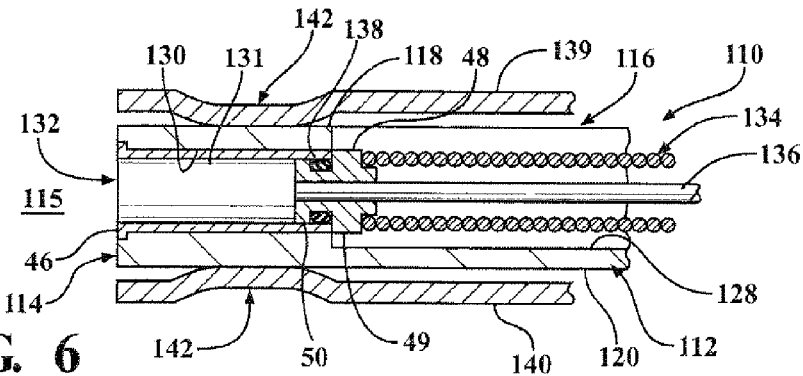
FIG. 6 is a cross-sectional side view of the gasket assembly of FIG. 4.

In FIG. 4, a portion of a compression sensor gasket assembly 110 constructed in accordance with another aspect of the invention is shown, wherein the same reference numerals offset by a factor of 100 are used to identify similar features as described above. The gasket assembly 110 has a gasket body 112 constructed similarly as described above, having one or more through openings 114 for receipt of fasteners and for the flow of gas and/or fluid therethrough. Further, the gasket body 112 has at least one passage 124 formed partially as a recessed channel (as discussed above) and/or a through slot (as discussed above), and as an enclosed passage extending between the opposite sealing surfaces 118, 120. For example, as best shown in FIG. 4, the passage 124 can be formed having a serpentine configuration having an arcuate, curvilinear (curved), and otherwise tortuous passage, and as best shown in FIGS. 5 and 6, can be formed having a recessed channel portion, referred to hereafter as channel 128, extending from an outer periphery 126 (FIG. 4) radially inwardly toward the through opening 114. The tortuous, curved configuration of the passage 124 can be routed as desired to extend and wind about various ones of the through openings 114, e.g. fastener openings, oil passages, and/or coolant passages. The recessed channel 128 can be milled, blanked, or otherwise formed in either of the sealing surfaces 118, 120. In addition, the passage 124 has a drilled portion 130, shown as extending from the recessed channel 128 radially inwardly through an inner periphery 122 of the through opening 114. The drilled portion 130 is straight or substantially straight, given a drilling process is used to form it, and can be sized for a close fit, such as line-to-line, with an outer housing 131 of the pressure sensor assembly 116, or it can be enlarged for receipt of a tubular adaptor sleeve or fitting 46, if desired. In the embodiment shown, the housing 131 is configured for receipt or partial receipt in the fitting 46. In addition, the pressure sensor assembly 116 is provided having a tubular guide member 134 extending substantially from the housing 131 to the outer periphery 126 of the gasket body 112. The guide member 134 is configured to receive a communication member, such as an electrical or optical communication member 136, such as a wire or fiber optic member therethrough for connection to the pressure sensor 132 at one end and a processor (not shown) at an opposite end to indicate the pressure within the cylinder bore 115. Rather than the guide member 134 being constructed as a generally rigid solid, straight piece of material, as illustrated in FIG. 1, the guide member 134 is formed from a spring member, such as a coil spring, or another suitable flexible tubular element constructed from any flexible or formable polymeric or metallic material. As such, the guide member 134 is able to be readily routed over the tortuous, winding path of the recessed channel 128. In addition, wherein the guide member 134 is provided as a coil spring guide member 134, the coil spring provides the additional benefit of enabling the pressure sensor 132 to withstand large compressive forces within the cylinder bore 115, while also maintaining the pressure sensor 132 in its desired sensing location during the engine combustion process by imparting a predetermined compressive spring force thereon.

To facilitate forming a hermetic seal between the pressure sensor 132 and the cylinder bore 115, an elastomeric seal member 138 can be provided to establish a gas tight seal between the housing 131 and the guide member 134. The seal member 138, as discussed above, can be provided as an o-ring having an outer diameter sized for a tight, sealing fit within the drilled or otherwise formed tubular portion 130, or, as illustrated, can be brought into sealed engagement with an inner surface of the insert 46 and have an inner diameter sized for a tight, sealing fit about an insertion adaptor member 48. The insertion adaptor member 48 is shown here, by way of example, as being constructed of a separate piece of material from the sensor housing 131, and having a generally dumbbell shape with an enlarged radially outwardly extending annular shoulder 49 that axially confronts an end of the insert 46 under bias imparted by the guide member 134 and a reduced diameter annular shoulder 50 configured for receipt inside the insert 46, wherein the shoulders 49, 50 are spaced axially from one another by an annular pocket sized to receive and maintain the annular seal member 138 in its intended sealing position within the insert 46. As such, a positive stop is established by the enlarged shoulder 49 against the end of the insert 46, and thus, the shoulder 49 functions to limit the insertion of and properly position the sensor 132 within the insert 46. Accordingly, the sensor 132 is assured of being properly positioned relative to the cylinder bore 115. Of course, the adaptor member 48 could be otherwise constructed, such as by being constructed as a single, monolithic piece of material with the sensor housing 131, for example.

As with the gasket assembly 10 discussed above, the gasket assembly 110, as shown in FIG. 6, can have at least one, and shown here, by way of example and without limitation, as having a pair of functional layers 139, 140 abutting the opposite sealing surfaces 118, 120 of the gasket body 112. The functional layers 139, 140 are shown, by way of example, as including sealing beads 142.

Figure 7:
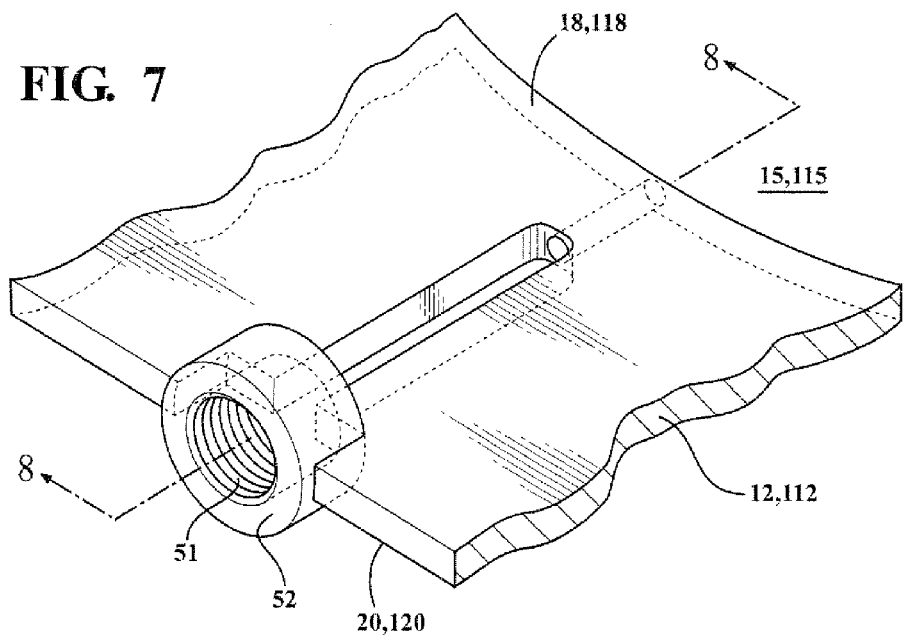
FIG. 7 is a partial perspective view showing an outer periphery of a gasket body constructed in accordance with another aspect of the invention.

In each of the embodiments discussed above, the sensor assembly, 16, 116, and in particular, the guide member 34, 134 and/or the communication member 36, 136 can be releasably attached to the respective gasket body 12, 112. One location for establishing the attachment is conveniently located at or adjacent the outer periphery 26, 126, although other locations are possible. For example, as shown in FIG. 7, by way of example and without limitation, a threaded mechanism of attachment can be used, wherein the gasket body 12, 112 has a female threaded portion 51, represented here, by way of example and without limitation, as being provided by a nut 52 having internal female threads, wherein the nut 52 is attached, such as via a weld joint, for example, to or adjacent the outer periphery 26, 126 of the gasket body 12, 112. Of course, if the gasket body has sufficient thickness adjacent its outer periphery 26, 126, the threaded portion 51 can be formed integrally within the material of the gasket body 12, 112, with the threaded portion 51 extending between the opposite sealing surfaces 18, 20, 118, 120.

Figure 8:
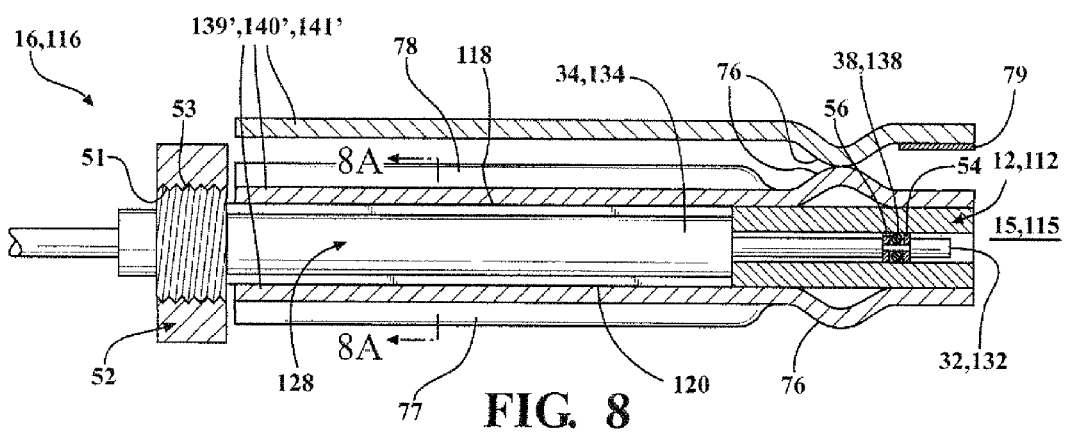
FIG. 8 is a cross-sectional side view showing a pressure sensor assembly and functional layers assembled to the gasket body of FIG. 7.
Figure 8A:
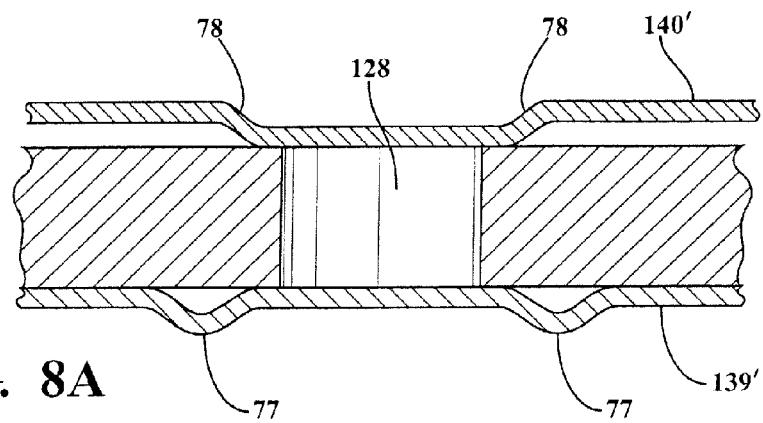
FIG. 8A is a cross-sectional view of the gasket assembly of FIG. 8.

As shown in FIG. 8, a male threaded member 53 is configured for threaded engagement in the female threaded portion 51, wherein the external threads of the male threaded member 53 can be formed in the outer surface of the guide member 34, 134, or they can be provided via a separate piece of material, such as via a threaded sleeve fixed to the guide member 34, 134. Regardless, upon threading the respective female and male threads with one another, the guide member 34, 134 is releasably attached to the gasket body 12, 112, thereby automatically bringing the sensor 32, 132 into its proper location relative to the cylinder bore 15, 115.

In addition to the seal member 38, 138, a combustion ring 54 and a back-up ring 56 can be disposed on opposite sides of the seal member 38, 138. The combustion ring 54 can be constructed of any suitable high temperature resistant material, such as metal, ceramic, high temperature polymeric materials, or the like, and functions to prevent the hot combustion gasses from acting on the seal member 38, 138. The back-up ring 56 can be constructed of any suitable rigid metallic or polymeric material and functions to prevent the seal member 38, 138 from extruding or becoming otherwise deformed during assembly and/or while in use. In addition, the back-up ring 56 can be constructed as a monolithic piece of material with the sensor housing, if desired.

In addition, functional layers 139', 140', 141' having half or full sealing beads can be provided to facilitate formation of an air/fluid tight seal between the members being clamped. The functional layers 139', 140' abutting the sealing surfaces 118, 120 can be provided to ensure that the slot 128 is sealed along its length against the ingress of gas and/or fluids by providing the functional layers 139', 140' with flat surfaces configured to directly abut and overlie the edges of the through slot 128 while in a relaxed state. Thus, the functional layers 139', 140' act not only to facilitate establishing an air/fluid tight seal between the members being clamped together, but also to seal off the through slot 128. It should be recognized that the beads 76 can be formed and/or oriented other than as shown. To further facilitate sealing off the through slot 128, the functional layers 139', 140' can have seal beads extending along the length of the through slot 128 on opposite sides of the through slot 128. The lower functional layer 139' is shown having a full bead 77 extending along the full or substantially full length of the through slot 128, while the upper functional layer 140' is shown having a half bead 78 extending along the full or substantially full length of the through slot 128, by way of example and without limitation. It should be recognized that this can be performed equally well with the embodiment above including the recessed channel 28, wherein the seal bead can extend along the full or substantially full length of the recessed channel 28 on opposite sides thereof. Further yet, to facilitate establishing an air/fluid tight seal about the combustion chamber 15, 115, an annular stopper layer 79 configured to register in axial alignment with the through opening 14, 114, and thus the cylinder bore 15, 115, can be disposed between the abutting functional layers 140', 141'.

Figure 9:
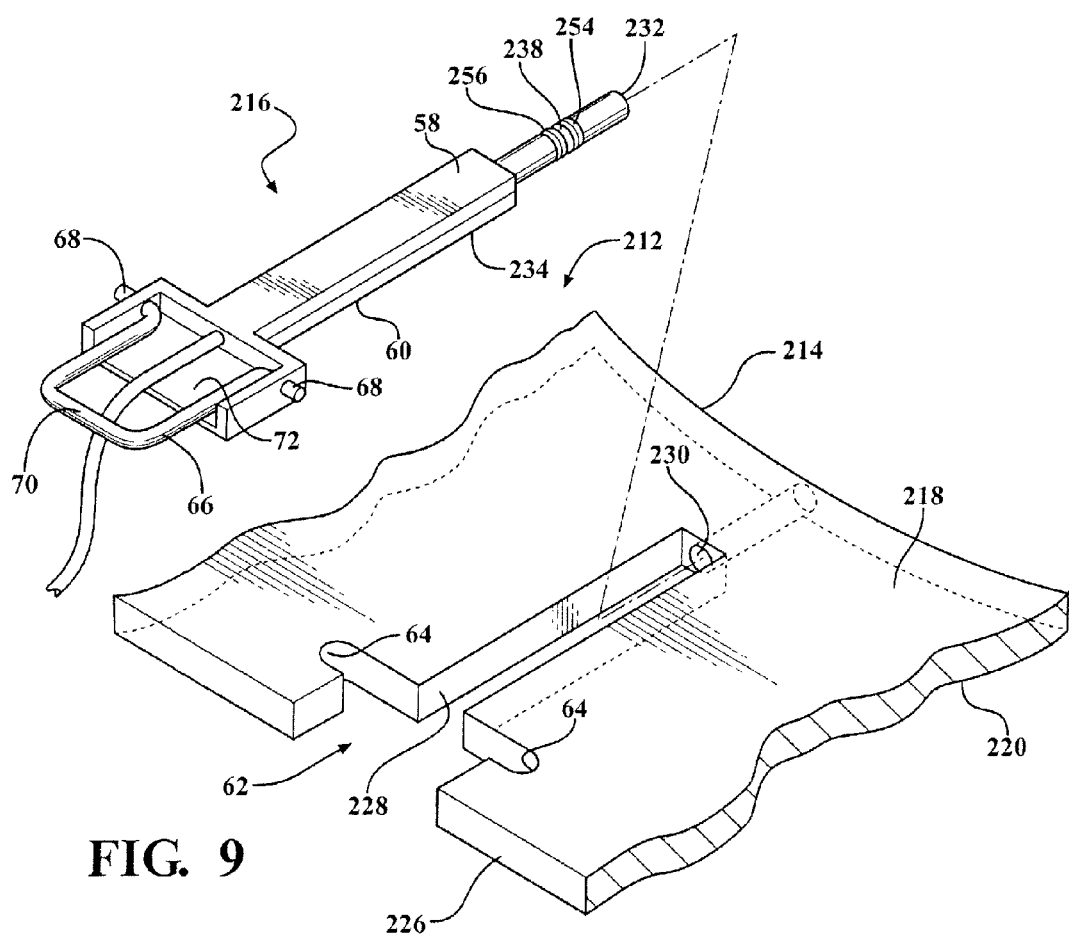
FIG. 9 is an exploded partial perspective view of a gasket assembly constructed in accordance with another aspect of the invention.
Figure 9A:
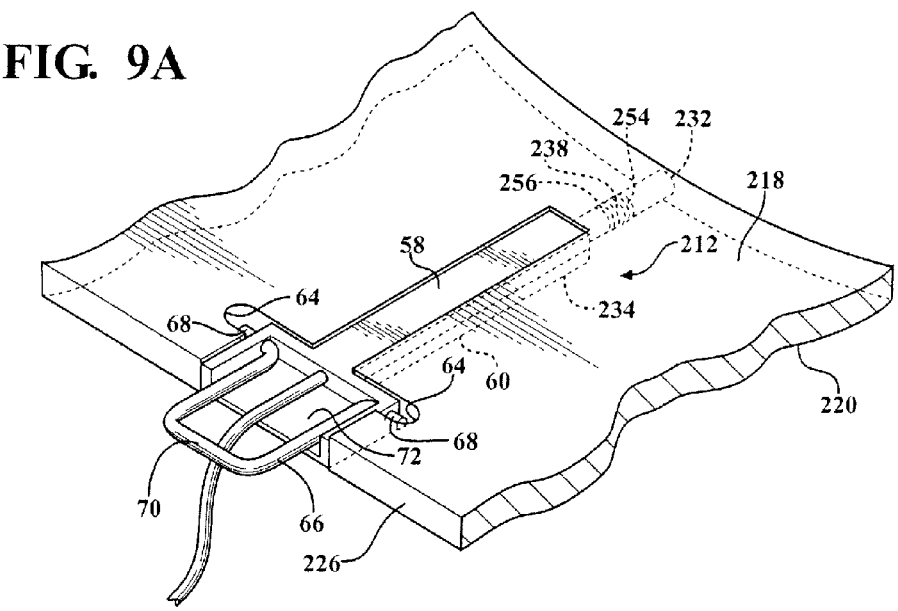
FIG. 9A is an assembled partial perspective view of the gasket assembly of FIG. 9.

As shown in FIG. 9, another mechanism for attaching a sensor assembly 216 to a gasket body 212 is shown, wherein the same reference numerals offset by a factor of 200 are used to identify similar features as described above. The gasket body 212 is constructed having at least one through opening 214 and a through slot 228 extending completely through the thickness of the gasket body 212 from an outer periphery 226 toward the through opening 214. Further, the gasket body 212 has an enclosed, drilled opening 230 extending radially inwardly from the through slot 228 into the through opening 214, wherein the drilled opening 230 is sized for receipt of a pressure sensor 232. As in the previous embodiment, a combustion ring 254 and a back-up ring 256 can be disposed on opposite sides of a seal member 238. The sensor assembly 216 has a guide member 234 sized for receipt in the through slot 228, wherein the guide member 234 can be constructed from a single piece of material or a multiple pieces of material sandwiched together. The guide member 234 can be constructed from any suitable polymeric or metallic material, and is shown as having opposite planar surfaces 58, 60 to provide a continuous smooth or flush surface with the opposite sealing surfaces 218, 220 of the gasket body 212. As such, the opposite surfaces 58, 60 of the guide member 234 can function as part of the sealing surfaces 218, 220 upon being assembled in the through slot 228. The mechanism of attachment within the through slot 228 illustrated can be used in any of the previously discussed channels 28, 128 and is shown as having an enlarged, keyed portion 62 extending into the outer periphery 226 of the gasket body 212. The keyed portion 62 has recessed notches, also referred to as pockets, key slots or slots 64, extending laterally away from one another for receipt of a portion of a retaining clip 66, shown as legs or tabs 68 extending outwardly from one another for close receipt in the slots 64. The clip 66 can be constructed having a metallic u-shaped portion 70 extending between the tabs 68, wherein the u-shaped portion can be sized for receipt in a recess pocket 72 of the guide member 234, as generally shown. During assembly, the u-shaped portion 70 can be squeezed to bring the tabs 68 toward one another against a spring bias of the clip 66, and then released for locking receipt in the slots 64.

Figure 10:
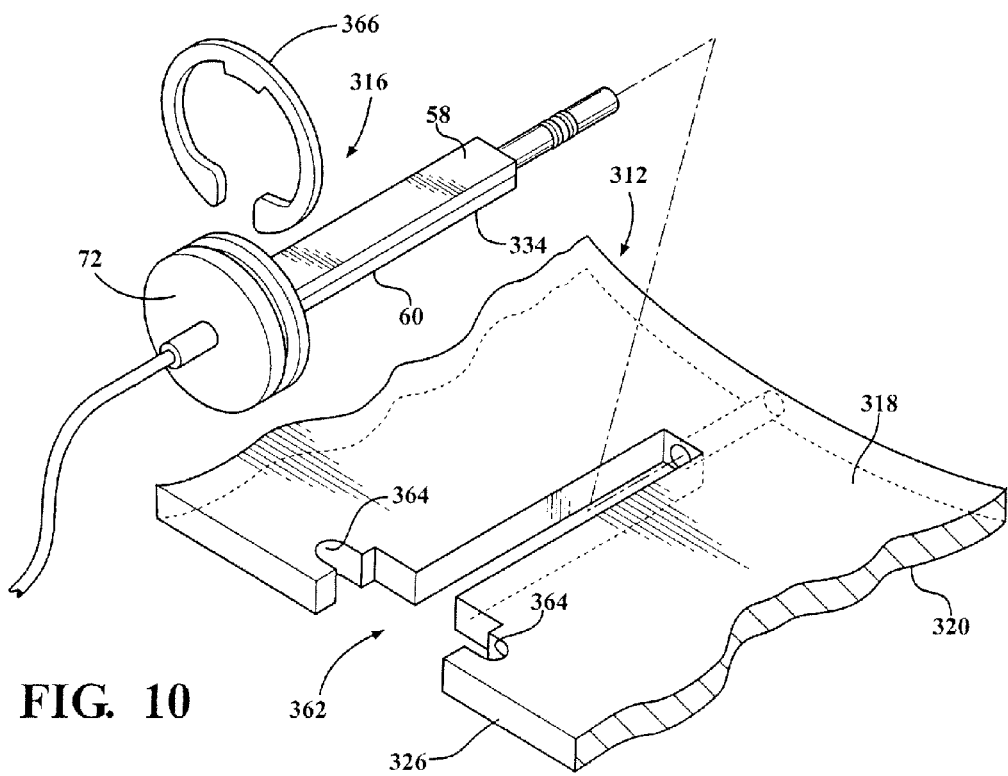
FIG. 10 is an exploded partial perspective view of a gasket assembly constructed in accordance with another aspect of the invention.
Figure 10A:
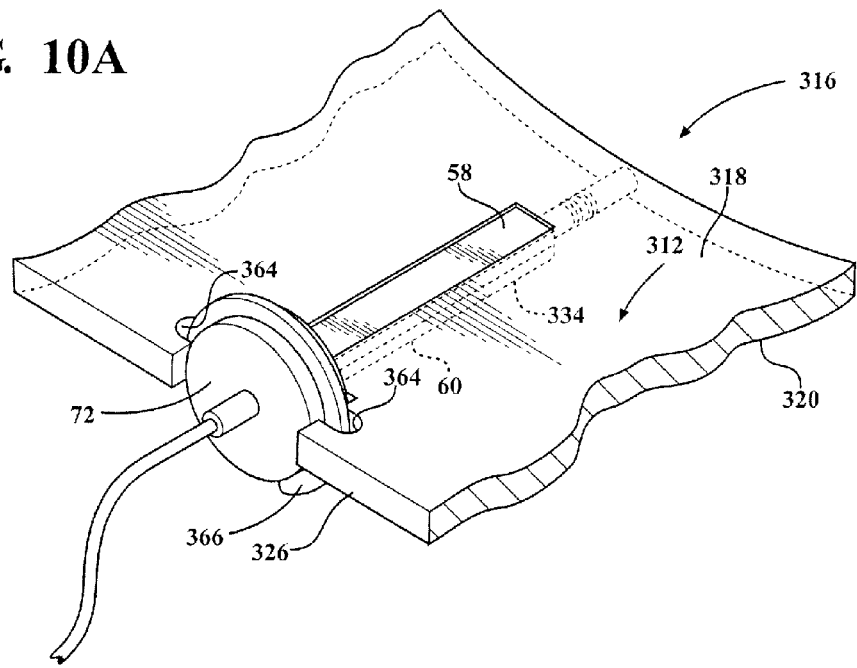
FIG. 10A is an assembled partial perspective view of the gasket assembly of FIG. 10.

In FIG. 10, another mechanism for attachment of a sensor assembly 316 is shown, wherein the same reference numerals offset by a factor of 300 are used to identify similar features as described above. The gasket body 312 is substantially the same as the gasket body 212 discussed above, having a keyed portion 362 extending into an outer periphery 326 of the gasket body 312. The keyed portion 362 has recessed slots 364 extending laterally away from one another for receipt of a portion of a retaining clip 366. The retaining clip 366 can be provided as a c-type clip, or otherwise configured to perform the desired retention function within the recessed slots 364. As with the previous embodiments, the sensor assembly 316 has a guide member 334 configured for receipt of an optical or electrical communication member therethrough, wherein the guide member 334 is shown as having a bulbous portion 72 having an annular groove 74 sized for clipped receipt of the retaining clip 366. The bulbous portion 72 is sized for receipt in an enlarged portion of the keyed portion 362, whereupon the retaining clip 366 extends radially into the recessed slots 364. As such, the sensor assembly 316 is releasably maintained in attached relation with the gasket body 312 via the retaining clip 366. It should be recognized that the bulbous portion 72 remains disposed externally to the members being clamped together, such as a cylinder head and engine block, and thus, the retaining clip 366 can be accessed and removed as desired to allow the sensor assembly 316 to be serviced without having to disassemble the clamped members.

Figure 10B:
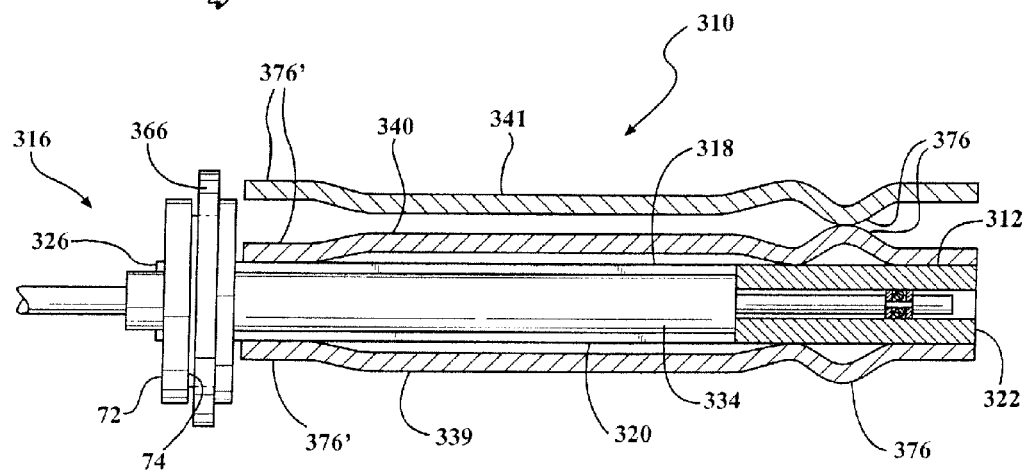
FIG. 10B is an assembled cross-sectional side view of the gasket assembly of FIG. 10 with functional layers thereon.

In FIG. 10B, a gasket assembly 310 is shown incorporating the sensor assembly 316 and gasket body 312 of FIG. 10. The gasket assembly has functional layers 339, 340, 341 having half or full sealing beads to facilitate formation of an air/fluid tight seal between the members being clamped. The functional layers 339, 340 are in direct abutment with the sealing surfaces 318, 320, while the functional layer 341 overlies and abuts the functional layer 340. In this embodiment, the functional layers 340, 341 have full beads 376 with peaks facing and abutting each other adjacent the inner periphery 322 of the gasket body 312 and half beads 376' diverging away from one another adjacent the outer periphery 326. Further, the functional layer 339 has a full bead 376 axially aligned with the full beads 376 of the functional layers 340, 341, however, the peaks of the full beads 376 of the layers 339, 340 face away from one another, and the half beads 376' of the layers 339, 340 converge toward one another.

Obviously, many modifications and variations of the present invention are possible in light of the above teachings. It is, therefore, to be understood that within the scope of the appended claims, the invention may be practiced otherwise than as specifically described.

What is claimed is:

1. A compression sensor gasket assembly, comprising:
  a gasket body having opposite sealing surfaces extending between an outer periphery and an inner periphery with said inner periphery bounding a through opening, said gasket body having a passage extending from said outer periphery through said inner periphery;

a pressure sensor assembly releasably attached to said gasket body in said passage and being configured to sense pressure within said through opening, wherein said passage includes a circumferentially enclosed bore portion extending between said opposite sealing surfaces, said bore portion being configured for receipt of at least a portion of said pressure sensor assembly, and at least one of a recessed channel portion extending into one of said opposite sealing surfaces and a through slot portion extending through both of said sealing surfaces for receiving another portion of said pressure sensor assembly;

wherein said circumferentially enclosed bore portion extends from said inner periphery and wherein said at least one recessed channel portion and said through slot portion extend from said enclosed bore portion toward said outer periphery; and further including a fastening device adjacent said outer periphery, said fastening device being configured for attachment to a portion of said pressure sensor assembly.

2. The compression sensor gasket assembly of claim 1 wherein said at least one recessed channel portion and said through slot portion are curved.

3. The compression sensor gasket assembly of claim 1 wherein said fastening device is a internally threaded nut fixed to said gasket body.

4. The compression sensor gasket assembly of claim 3 wherein said pressure sensor assembly has an externally threaded portion configured for threaded attachment to said internally threaded nut.

5. The compression sensor gasket assembly of claim 1 wherein said passage includes said recessed channel portion and at least one functional layer overlying said recessed channel portion.

6. The compression sensor gasket assembly of claim 5 wherein said at least one functional layer abuts at least one of said opposite sealing surfaces and seals off said recessed channel portion.

7. The compression sensor gasket assembly of claim 6 wherein said at least one functional layer has sealing beads on opposite sides of said recessed channel portion.

8. The compression sensor gasket assembly of claim 5 wherein said passage includes said through slot portion and a pair of functional layers overlying opposite sides of said through slot portion and abutting said opposite sealing surfaces.

9. The compression sensor gasket assembly of claim 8 wherein said functional layers have sealing beads on opposite sides of said through slot portion.

10. The compression sensor gasket assembly of claim 9 wherein said sealing beads are half beads diverging away from said through slot portion.

11. A method of constructing a pressure sensor gasket for sensing pressure within a cavity of an internal combustion engine, comprising:

providing a substantially flat gasket body having opposite sealing surfaces extending between an outer periphery and a through opening configured to register with a cavity in the internal combustion engine;

forming a passage extending from the outer periphery of the gasket body to the through opening;

disposing a pressure sensor assembly in the passage with a sensor portion of the pressure sensor assembly facing the through opening and fastening the sensor assembly to the gasket body adjacent the outer periphery; and further including providing an internally threaded nut fixed to the gasket body adjacent the outer periphery and an externally threaded portion on the pressure sensor assembly configured for threaded attachment to the internally threaded nut.

12. The method of claim 11 further including forming the passage having a curved portion extending between the outer periphery and the through opening.

13. The method of claim 11 further including forming the passage having a circumferentially enclosed bore portion configured for receipt of the sensor portion and having at least one of a recessed channel portion extending into one of the sealing surfaces and a through slot portion extending through both of the sealing surfaces for receiving another portion of the pressure sensor assembly.

14. A method of constructing a pressure sensor gasket for sensing pressure within a cavity of an internal combustion engine, comprising:

providing a substantially flat gasket body having opposite sealing surfaces extending between an outer periphery and a through opening configured to register with a cavity in the internal combustion engine;

forming a passage having a curved portion extending between the outer periphery and the through opening;

disposing a pressure sensor assembly in the passage with a portion of the pressure sensor assembly winding through the curved portion;

further including providing the pressure sensor assembly with a flexible, tubular guide member winding through the curved portion; and further including providing the flexible, tubular guide member as a coil spring.

15. The method of claim 14 further including providing the pressure sensor assembly with a pressure sensor and imparting a bias via the coil spring to maintain the pressure sensor adjacent the through opening.

* * * * *